(12) United States Patent
Burkhart et al.

(10) Patent No.: US 8,960,232 B2
(45) Date of Patent: Feb. 24, 2015

(54) LATCH VALVE FOR ACTUATING A TRANSMISSION CONTROL ELEMENT

(75) Inventors: Robert O. Burkhart, Novi, MI (US);
John Butwin, Ann Arbor, MI (US);
Derek Kinch, Ypsilanti, MI (US);
Hrudaya Mahapatro, Canton, MI (US);
Wei Zhuang, Canton, MI (US);
Anthony Koenings, Oakland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 690 days.

(21) Appl. No.: 13/225,841

(22) Filed: Sep. 6, 2011

(65) Prior Publication Data
US 2013/0056657 A1 Mar. 7, 2013

(51) Int. Cl.
| | | |
|---|---|---|
| *F16K 31/124* | (2006.01) | |
| *F15B 13/043* | (2006.01) | |
| *F15B 13/04* | (2006.01) | |
| *F16H 61/02* | (2006.01) | |
| *F16D 48/02* | (2006.01) | |
| *F16H 61/00* | (2006.01) | |

(52) U.S. Cl.
CPC ............ *F16D 48/02* (2013.01); *F15B 13/0402* (2013.01); *F16H 61/0276* (2013.01); *F16D 2048/0209* (2013.01); *F16H 2061/0279* (2013.01); *F16D 2048/0221* (2013.01)
USPC .................. 137/625.64; 192/85.63; 475/127; 477/127

(58) Field of Classification Search
CPC .............. F15B 13/043; F15B 13/0433; F15B 13/0435; F16D 48/02; F16D 2048/0209; F16D 2048/0221
USPC ........ 137/625.64, 625.66; 192/85.63; 251/50; 477/127; 475/127
See application file for complete search history.

(56) References Cited

U.S. PATENT DOCUMENTS

| | | | |
|---|---|---|---|
| 7,082,965 B2 | 8/2006 | Holmes et al. | |
| 2002/0113677 A1 | 8/2002 | Holmes et al. | |
| 2006/0006736 A1 | 1/2006 | Berger et al. | |
| 2006/0105882 A1* | 5/2006 | Park et al. ...................... | 477/127 |
| 2010/0313970 A1* | 12/2010 | Mahapatro et al. ......... | 137/484.2 |
| 2012/0193188 A1* | 8/2012 | Neelakantan et al. ..... | 192/85.63 |
| 2012/0216883 A1* | 8/2012 | Frait .............................. | 137/511 |
| 2013/0026401 A1* | 1/2013 | Burkhart et al. .......... | 251/129.15 |

FOREIGN PATENT DOCUMENTS

DE 10308144 A1 * 9/2004

* cited by examiner

*Primary Examiner* — John Rivell
(74) *Attorney, Agent, or Firm* — James Dottavio; MacMillan, Sobanski & Todd, LLC

(57) ABSTRACT

A latch valve includes a first port containing line pressure, a second port containing control pressure, a third port located between the first and second ports, alternately connecting the first and second ports to a transmission control element, and a fourth port containing control pressure that tends to close the second port and open the first port in opposition to a spring force.

21 Claims, 3 Drawing Sheets

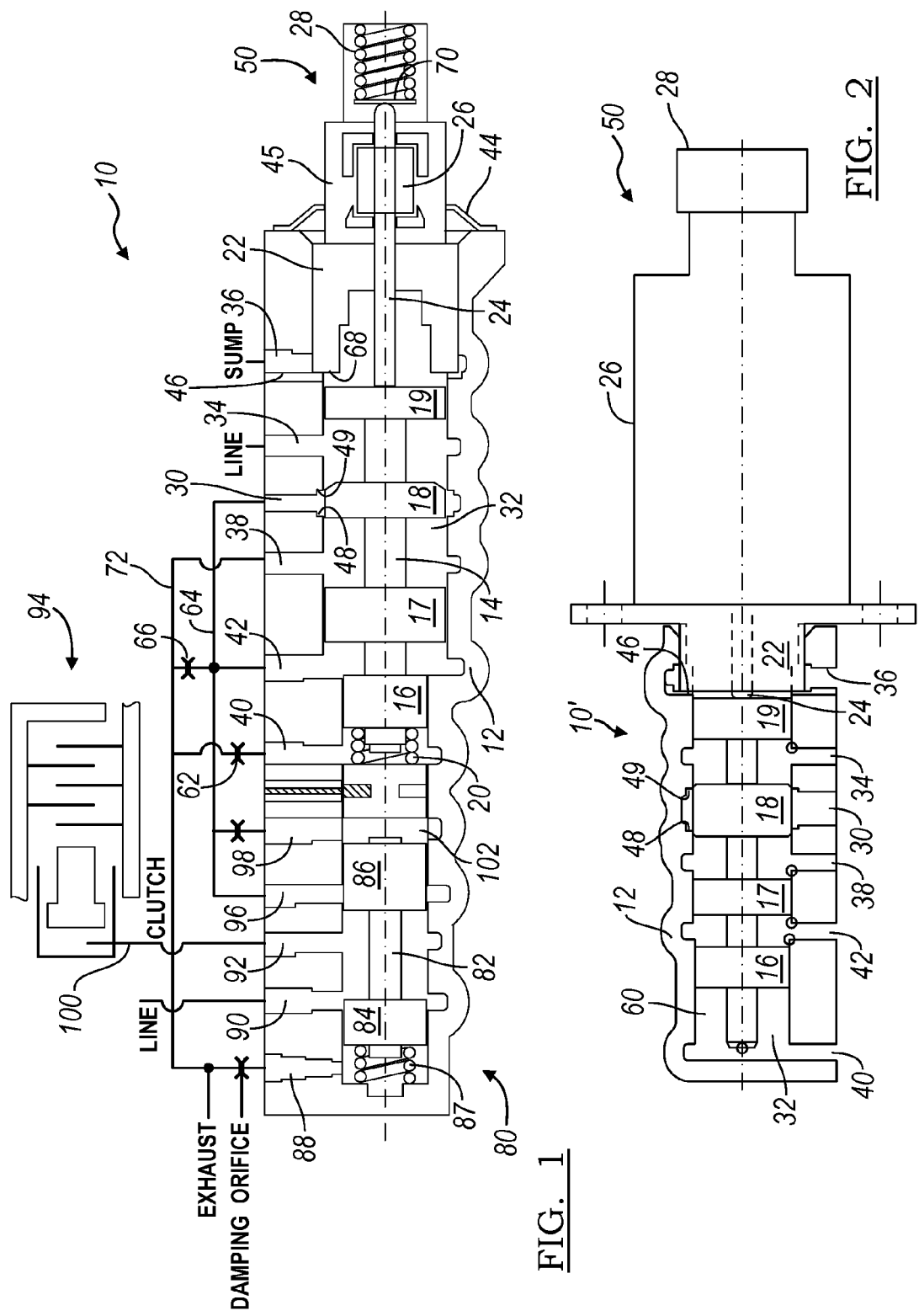

LATCH VALVE FOR ACTUATING A TRANSMISSION CONTROL ELEMENT

BACKGROUND OF THE INVENTION

1. Field of the Invention

This invention relates generally to a regulator spool valve controlled by a direct acting solenoid with a multiplex latch valve and located in a machined main control casting of an automatic transmission.

2. Description of the Prior Art

An automatic transmission includes a hydraulic system for regulating fluid pressure and hydraulic fluid flow in various lines connected to components of the transmission. The system includes a regulator spool valve packaged in a main control casting, which is machined at a transmission production plant. The casting, preferably of an aluminum alloy, is usually referred to as a valve body. The components of the system are assembled in the valve body and have transfer functions characterized at the plant.

A solenoid-actuated regulator valve controls pressure communicated from the valve to a clutch or brake whose state of engagement and disengagement determines the gear in which the transmission operates.

Transmissions clutch regulators require a method to provide hydraulic pressure to clutches and brakes for high torque operating conditions such that the required pressure can be delivered independently of the control pressure range suitable for shift control. The separation of static capacity (high torque) and dynamic control pressure ranges is accomplished through use of latch valves.

The typical latch valve acts to override the regulation of the clutch regulator by exhausting the feedback pressure at the spool. This causes the spool to no longer be in force equilibrium, resulting in spool traveling to its limit opening full communication between supply and control pressure ports. The exhaust of the feedback port and subsequent valve travel result in significant delay and undershoot in clutch control pressure on transition back to dynamic pressure control state.

A need exists in the industry for a latch valve formed in a valve body and operating with a regulating valve such that shift control of a transmission control element can be separated from the high pressure that is used to produce the high torque transmitting capacity of the control element when the element is engaged, which will eliminate deficiencies associated with altering regulator feedback pressure, and can be used in conjunction with self-contained devices such as direct acting solenoids.

SUMMARY OF THE INVENTION

A latch valve includes a first port for containing line pressure, a second port for containing control pressure, a third port located between the first and second ports, alternately connecting the first and second ports to a transmission control element, and a fourth port for containing control pressure that tends to close the second port and open the first port in opposition to a spring force.

A method for operating the latch valve includes supplying line pressure to a first port, supplying control pressure to a second port, alternately connecting the first and second ports to a transmission control element through a third port located between the first and second ports, controlling the valve using control pressure tending to close the second port and open the first port in opposition to a spring force, and latching the valve when the first port opens and the second port closes.

A multiplexing latch valve that can continue to move throughout the pressure range of the regulator valve doubles as a compliance source to stabilize the regulator valve when the transmission control element is not connected to the regulator valve. This combination maintains the regulator valve in a pressurized state with normal feedback even when the control element is latched to line pressure.

The latch valve is actuated by regulator control pressure to selectively connect either regulator control pressure or line pressure to the control element.

The multiplexing architecture can be applied to either a variable bleed solenoid (VBS) regulator valve paired systems or to direct acting solenoid systems. For the direct acting solenoid system, latch occurs without the addition of another solenoid, either to supplement the force of the primary solenoid coil or as an On-Off control of a similar multiplexing latch valve.

The latch valve provides circuit compliance to stabilize the regulator valve after it is disconnected from the clutch, thereby eliminating need for a separate accumulator part.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 1 is a cross section of a casting-integrated direct acting regulating solenoid valve and a latch valve;

FIG. 2 is a cross section of a modification of the valve of FIG. 1 with the spool removed from the valve chamber;

DESCRIPTION OF THE PREFERRED EMBODIMENT

Figure 3:
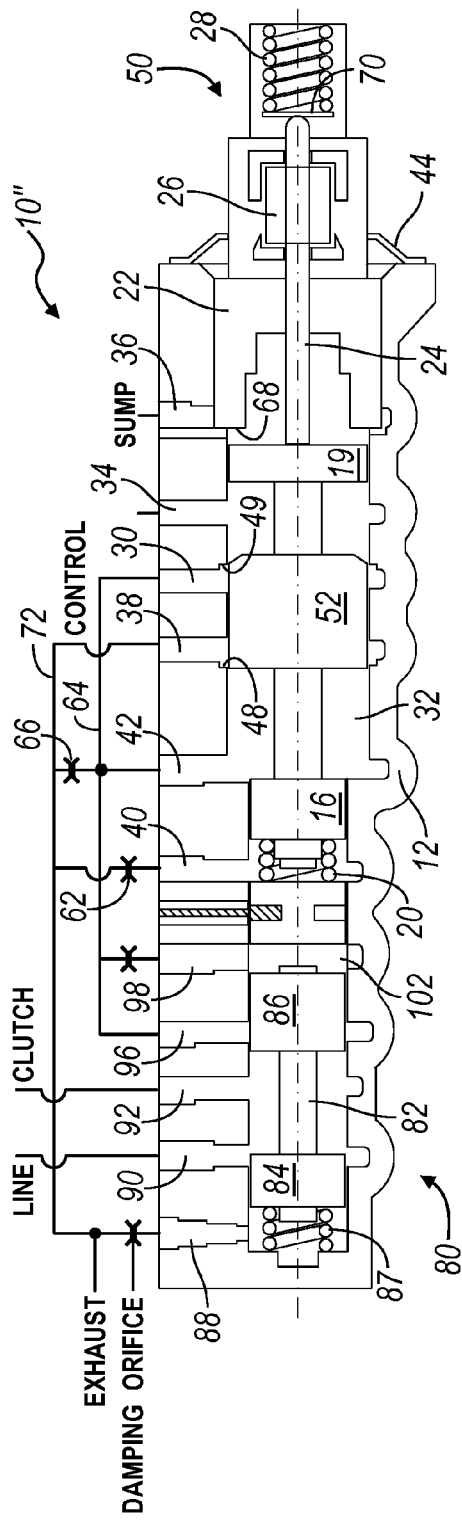
FIG. 3 is a cross section of a casting-integrated direct acting regulating solenoid valve showing the spool located in the valve chamber.

The casting-integrated, direct acting solenoid hydraulic valve 10 shown in FIGS. 1 and 2 includes a valve body 12 formed of cast metal, preferably an aluminum alloy. The valve body 12 contains a valve spool 14, formed with lands 16-19; a compression spring 20 urging the spool rightward; an adapter 22; an armature pin 24 extending through the adapter and contacting the spool; an electromagnetic solenoid 26, which actuates the pin to move leftward when the solenoid is energized and allows the spool to move rightward when the solenoid is deenergized; and a second compression spring 28 for maintaining the pin in contact with the spool.

Preferably spring 20 has a relatively low spring constant so that control pressure produced by valve 10 is substantially zero when no electric current is supplied to energize the solenoid 26.

The valve body 12 is formed with control ports 30, 42 through which control pressure communicates with the chamber 32 containing the spool 14; a line pressure port 34, through which line pressure communicates with the chamber; sump port 36, through which hydraulic fluid flows from the chamber to a low pressure sump; and a exhaust ports 38, 40, through which the chamber 32 communicates with a low pressure exhaust.

Adapter 22 is continually held in contact with an installation datum or reference surface 46 formed in sump port 34 by the elastic force produced by a resilient clip 44, which is secured to the outer surface of a housing 45 that encloses the solenoid 26.

In operation, valve 10 regulates control pressure in port 30 and feedback pressure in port 42 by producing a first sum of the force of spring 20 and the rightward net force due to control pressure in port 42 acting on the differential areas of lands 16 and 17. Balancing the first sum of forces is a second sum of leftward forces comprising the force of the solenoid-actuated pin 24 and the force of spring 28. As the force of pin 24 increases, valve 10 opens a connection through metering edge 49 between line pressure in port 34 and control pressure in ports 30, 42. As metering edge 49 open, control pressure increases. When control pressure increases sufficiently for the current position of pin 24, the differential feedback control pressure on lands 16, 17 causes the metering edge 49 to close and metering edge 48 to open a connection between control pressure port 30 and to the low pressure exhaust through chamber 32, exhaust port 38 and passage 72.

A single flycutting tool concurrently machines both of the metering edges 48, 49 and the installation datum or reference surface 46 in the valve body. The solenoid module 50 includes adapter 22, solenoid 26, housing 45 and spring 28.

All edges that requiring precise relative positions are cut in a single operation for improved tolerances and manufacturing efficiency. Metering edges are precision machined rather than cast for improved edge quality, location accuracy, and zero draft. High precision tolerances enable close control of leakage and pressure regulation accuracy. Close tolerances enable flow control with a short stroke magnetic section 50.

A single metering control pressure port 30 at spool land 18 (Meter Out-Meter In, as shown in FIG. 1) or dual metering control pressure ports 30, 38 at control land 52 (Meter Out-Meter Out, as shown FIG. 3) can be accommodated with no change in tolerances. A clear division of tolerance responsibility is established for the two manufacturing groups.

The valves shown in FIGS. 1-3 enable standard main control (multi-bore including worm trail) configurations while providing magnet interface tolerances.

A control pressure bleed port 38 provides for spool position control and stability. Tracking response is improved with no dead-zone to cross. Low frequency hunting across the dead-zone is also prevented.

Tight machining tolerances allow for minimized overlap reducing dead band.

In FIG. 2 the diameter of control land 17 is larger than the diameter of land 16 of valve 10'. The large diameter land 16 of valve 10' defines a large diameter spool end damper 60 for enhancing stability, permitting use of a relatively large diameter, contamination resistant damper port 62. Damper 60 is formed outside of the feedback path 64 for minimum feedback lag and improved stability. The diameter of damper 60 is large relative to the difference in diameter of the lands 16 and 17.

The large diameter of spool land 16 and damper 60 combined with flow notches enables high flow with short stroke magnet as well as fly cut manufacturing technique.

The axial surface 68 of adapter 22 is located in chamber 32 due to contact with reference surface 46 such that, when solenoid 26 is deenergized and spool 14 moves rightward in the chamber, land 19 contacts surface 68 before the armature pin 24 contacts a stop surface 70 in the solenoid module, thereby preventing spring 28 from becoming fully compressed due to contacts among its coils. In this way, the spool end feature provides positive stop for forced over travel protection of the solenoid module 50.

Damping chamber 60 is provided with an oil reservoir using an elevated vent 66 and fed from the control pressure bleed port 42.

The casting-integrated, direct acting solenoid hydraulic valves 10, 10" each includes a latch valve 80 formed in the valve body 12 of cast metal. Valve 80 includes a spool 82, formed with lands 84, 86; a compression spring 87 urging spool 82 rightward; exhaust port 88; line port 90, connected to a source of line pressure whose magnitude is substantially constant; an outlet port 92, through which a clutch or brake 94 of the transmission is actuated; a control port 96 communicating through passage 64 with control pressure ports 30, 42 of regulator valve 10; and a control pressure feedback port 98 also communicating through passage 64 with control pressure ports 30, 42 of regulator valve 10.

In operation, valve 80 supplies actuating pressure through line 100 to the cylinder 102 of a hydraulic servo that actuate the transmission control element 94. When control pressure generated force is lower than spring installed load, spring 87 forces spool 82 to the right-hand end of the chamber, thereby closing line port 90, opening control port 96 and communicating fluid at control pressure to the control element 94 through outlet port 92 and line 100. As control pressure increases, spool 82 moves axially leftward along the valve chamber due to a force produced by control pressure in feedback port 98 acting in opposition to the force of spring 87. After the clutch is fully engaged and control pressure increases further land 86 gradually closes port 96, and land 84 maintains line port 90 closed. As control pressure increases further, land 86 closes control port 96, and land 84 opens a connection between line port 90 and output port 92, thereby bypassing valve 80 and pressurizing control element 94 using line pressure, which is based on static capacity of applied clutches. If control pressure increases further after valve 80 is latched, line pressure alone is applied to fully engage the control element 94. The spool 14 of regulating valve 10 is maintained in its regulating position while valve 80 is latched.

Valve 80 is delatched by reducing control pressure, which causes land 84 to close line port 90, and land 86 to reopen a connection between control port 96 and the transmission control element 94 through outlet port 92 and line 100.

Figure 4:
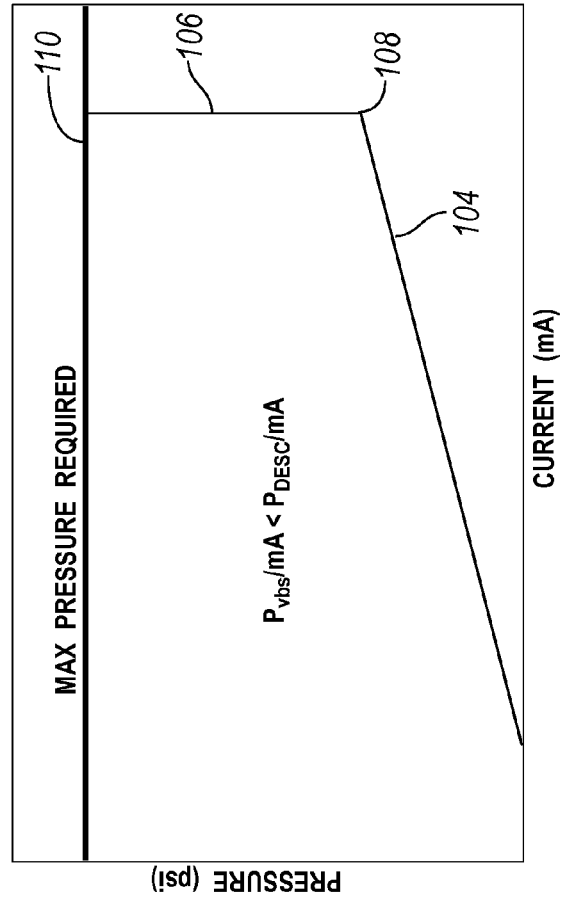
FIG. 4 is a graph of control element pressure and solenoid current during engagement of the control element.

FIG. 4 shows the variation of outlet pressure in port 92 in response to current in solenoid 26. The first portion of the relation occurs as control pressure is increased while control port 96 is connected to outlet port 92 and line port is closed. The second portion 106 occurs after point 108 where control port 96 closes and constant line pressure through port 90 opens to outlet port 92 bringing the control element to full capacity at 110. The two portions allow for increased pressure to current resolution (reduced gain) while maintaining overall achievable pressure range, as seen when compared variation of system without latch feature.

The feedback chamber 102 of valve 80 is not exhausted when valve 80 is latched, thereby eliminating the possibility of entrapping air in the lines feeding control element 94. Because the feedback chamber 102 of valve 80 is not exhausted when valve 80 is latched, those lines need not be refilled when valve 80 is delatched.

Figure 5:
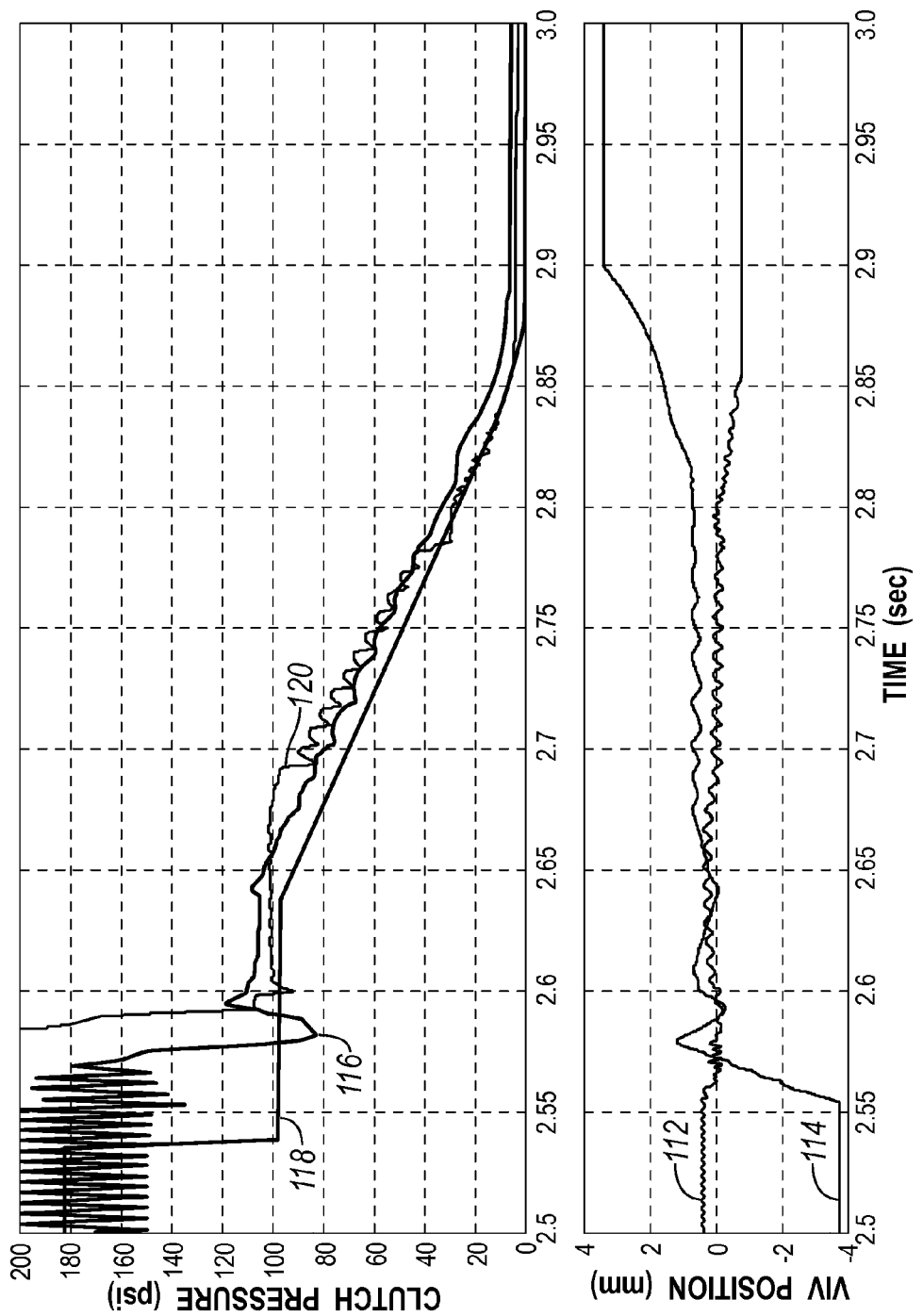
FIG. 5 includes graphs of delatch pressure and regulating spool position while the latch valve is delatched.

The regulator valve 10 and latch valve 80 in combination provide functional advantages in transition states of clutch control by performing the latch transition while maintaining regulation control. As FIG. 5 shows, upon delatching valve 80, the position 112 of spool 14 of the regulator valve 10 remains in a control metering position because its spool was regulating to the deadheaded circuit 96 and compliance volume 98 while latched and provides superior transition when switched to regulating to the line 100 and control element 94 compared to a VBS-regulator-latch valve system 114.

A VBS-regulator-latch system commonly experiences pressure undershoots 116 past the desired delatch pressure 118, whereas the delatch pressure transient 120 produced by the combination of valves 10, 80 closely tracks the desired delatch pressure 118 with virtually no undershoot.

The latch valve is applicable to both VBS/VFS actuated spool valves and direct acting solenoid controlled systems.

In accordance with the provisions of the patent statutes, the preferred embodiment has been described. However, it should be noted that the alternate embodiments can be practiced otherwise than as specifically illustrated and described.

The invention claimed is:

1. A latch valve, comprising:
   a first port for containing line pressure;
   a second port for containing control pressure;
   a third port located between and adjacent to the first and second ports, alternately connecting the first and second ports to a transmission control element; and
   a fourth port for containing the control pressure that tends to close the second port and open the first port in opposition to a spring force.

2. The latch valve of claim 1, further comprising:
   a spool including a first land that opens and closes the first port, and a second land that opens and closes the second port; and
   a chamber containing the spool and able to communicate with the first, second and third ports.

3. The latch valve of claim 1, further comprising:
   a chamber continually communicating with the third port, containing a spool that includes first and second lands, the first land opening a connection between first port and the third port through the chamber when the second land closes the second port, the second land opening a connection between second port and the third port through the chamber when the first land closes the first port.

4. The latch valve of claim 1, further comprising:
   a chamber containing the spool, able to communicate with the first and second ports, continually communicating with the transmission control element and the fourth port, the spool displaceable in the chamber by a force produced by the spring and a force produced by the control pressure in the fourth port.

5. The latch valve of claim 1, wherein
   the first land has a first surface located at an inner axial end of the first land, the first surface having a first area; and
   the second land has a second surface located at an inner axial end of the second land, the second surface having a second area that is substantially equal to the first area.

6. The latch valve of claim 5, wherein
   the second land has a third surface located at an outer axial end of the second land, the third surface having an area that is substantially equal to the second area.

7. The latch valve of claim 2, wherein the second and fourth ports are connected to a source of control pressure produced by a control valve, comprising:
   a valve body of cast metal, including a chamber and a control pressure port;
   metering edges machined in the valve body at the control pressure port;
   a reference surface machined in the valve body;
   a second spool displaceable along the chamber; and
   a solenoid module including a pin for displacing the second spool, and located in the chamber by contact with the reference surface.

8. A latch valve, comprising:
   a spool displaceable in a chamber, including first and second lands;
   a first port opened and closed by the first land, connectable to line pressure;
   a second port opened and closed by the second land, connectable to a source of control pressure;
   a third port located between and adjacent to the first and second ports, alternately connecting the first and second ports to a transmission control element through the chamber.

9. The latch valve of claim 8, wherein the chamber is able to communicate alternately with the first and second ports, and the chamber continually communicates with the third port.

10. The latch valve of claim 8, wherein:
    the chamber continually communicates with the third port;
    the first land opens a connection between first port and the third port through the chamber when the second land closes the second port; and
    the second land opens a connection between second port and the third port through the chamber when the first land closes the first port.

11. The latch valve of claim 8, wherein:
    the chamber is able to communicate alternately with the first and second ports;
    the chamber continually communicates with the transmission control element and a fourth port connectable to the source of control pressure; and
    the spool is displaceable in the chamber by a force produced by a spring and a force produced by control pressure in the fourth port.

12. The latch valve of claim 8, wherein
    the first land has a first surface located at an inner axial end of the first land, the first surface having a first area; and
    the second land has a second surface located at an inner axial end of the second land, the second surface having a second area that is substantially equal to the first area.

13. The latch valve of claim 12, wherein
    the second land has a third surface located at an outer axial end of the second land, the third surface having an area that is substantially equal to the second area.

14. The latch valve of claim 9, further comprising:
    a fourth port, the second and fourth ports are connected to the source of control pressure produced by a control valve, comprising:
    a valve body of cast metal, including a control chamber and a control pressure port;
    metering edges machined in the valve body at the control pressure port;
    a reference surface machined in the valve body;
    a second spool displaceable along the control chamber; and
    a solenoid module including a pin for displacing the second spool, and located in the control chamber by contact with the reference surface.

15. A method for operating a latch valve, comprising:
    supplying line pressure to a first port;
    supplying control pressure to a second port;
    alternately connecting the first and second ports to a transmission control element through a third port located between and adjacent to the first and second ports;

controlling the valve using the control pressure tending to close the second port and open the first port in opposition to a spring force; and latching the valve when the first port opens and the second port closes.

16. The method of claim 15, further comprising engaging the transmission control element using the line pressure.

17. The method of claim 15, further comprising engaging the transmission control element using the line pressure while increasing the control pressure magnitude after the valve latches.

18. The method of claim 15, comprising delatching the valve using the control pressure to reclose the first port and reopen the second port.

19. The method of claim 15, comprising delatching the valve by decreasing the control pressure to a lower magnitude than the magnitude of the control pressure at which the valve was latched.

20. A latch valve, comprising:
a first port for containing line pressure;
a second port for containing control pressure;
a third port located between and adjacent to the first and second ports, alternately connecting the first and second ports to a transmission control element;
a fourth port for containing the control pressure that tends to close the second port and open the first port in opposition to a spring force; and
wherein the second and fourth ports are connected to a source of control pressure produced by a control valve, comprising:
a valve body of cast metal, including a chamber and a control pressure port;
metering edges machined in the valve body at the control pressure port;
a reference surface machined in the valve body;
a second spool displaceable along the chamber; and
a solenoid module including a pin for displacing the second spool, and located in the chamber by contact with the reference surface.

21. A latch valve, comprising:
a spool displaceable in a chamber, including first and second lands;
a first port opened and closed by the first land, connectable to line pressure;
a second port opened and closed by the second land, connectable to a source of control pressure;
a third port located between and adjacent to the first and second ports, alternately connecting the first and second ports to a transmission control element through the chamber; and
a fourth port, wherein the second and fourth ports are connected to the source of control pressure produced by a control valve, comprising:
a valve body of cast metal, including a control chamber and a control pressure port;
metering edges machined in the valve body at the control pressure port;
a reference surface machined in the valve body;
a second spool displaceable along the control chamber; and
a solenoid module including a pin for displacing the second spool, and located in the control chamber by contact with the reference surface.

* * * * *